United States Patent
Huotari et al.

(10) Patent No.: US 7,870,600 B2
(45) Date of Patent: Jan. 11, 2011

(54) APPARATUS AND METHOD FOR SECURE CONFIGURATION OF SHARED POWERLINE DEVICES

(75) Inventors: Allen J. Huotari, Garden Grove, CA (US); Kendra S. Harrington, Irvine, CA (US); Matthew McRae, Laguna Beach, CA (US)

(73) Assignee: Cisco Technology, Inc., San Jose, CA (US)

( * ) Notice: Subject to any disclaimer, the term of this patent is extended or adjusted under 35 U.S.C. 154(b) by 1172 days.

(21) Appl. No.: 11/510,406

(22) Filed: Aug. 25, 2006

(65) Prior Publication Data

US 2008/0052760 A1 Feb. 28, 2008

(51) Int. Cl.
G06F 7/04 (2006.01)
G06F 17/30 (2006.01)
G06F 15/177 (2006.01)

(52) U.S. Cl. .............................. 726/2; 370/463; 709/220
(58) Field of Classification Search ...................... 726/2; 370/463; 709/220
See application file for complete search history.

(56) References Cited

U.S. PATENT DOCUMENTS

| | | | |
|---|---|---|---|
| 5,394,402 A * | 2/1995 | Ross ........................... 370/402 |
| 6,490,276 B1 * | 12/2002 | Salett et al. .................. 370/360 |
| 6,496,502 B1 * | 12/2002 | Fite et al. ..................... 370/389 |
| 7,590,144 B1 * | 9/2009 | Ladd ............................ 370/466 |
| 2003/0035430 A1 * | 2/2003 | Islam et al. .................. 370/401 |
| 2003/0120763 A1 * | 6/2003 | Volpano ...................... 709/223 |
| 2004/0133689 A1 * | 7/2004 | Vasisht ........................ 709/228 |
| 2004/0252650 A1 * | 12/2004 | Vageline et al. ............. 370/254 |
| 2005/0021684 A1 * | 1/2005 | Hsue et al. ................... 709/220 |
| 2005/0125692 A1 * | 6/2005 | Cox et al. .................... 713/201 |
| 2006/0173978 A1 * | 8/2006 | Palm et al. ................... 709/220 |
| 2007/0044141 A1 * | 2/2007 | Lor et al. ........................ 726/3 |

* cited by examiner

*Primary Examiner*—Michael J Simitoski
(74) *Attorney, Agent, or Firm*—Haynes and Boone, LLP.

(57) ABSTRACT

Client adapter and method simplify security deployment in an EPN, including the shared services electrical power lines of a premises. With direct coupling, piggybacked adapter receives network signals and electrical from EPN-connected first adapter through a shared medium port. An authenticating adapter exchanges security management services and information with supplicant adapter. Two or more adapters may be piggybacked. Piggybacked adapters exchange security management service information without rogue intrusion. Exchanged information, stored, is later used to communicate securely. Defined adjacency (neighborhood) information can be exchanged, and a neighborhood established on an EPN, where one authorized neighbors securely communicate.

11 Claims, 2 Drawing Sheets

APPARATUS AND METHOD FOR SECURE CONFIGURATION OF SHARED POWERLINE DEVICES

CROSS-REFERENCE TO RELATED APPLICATIONS

This U.S. Patent Application is related to co-pending, co-assigned, U.S. patent application Ser. No. 11/510,449, entitled, "APPARATUS AND METHOD FOR SECURE CONFIGURATION OF SHARED MEDIUM DEVICES," filed on Aug. 25, 2006, which U.S. Patent Application is incorporated herein in its entirety; and to co-pending, co-assigned, U.S. patent application Ser. No. 11/510,159, entitled, "APPARATUS AND METHOD FOR RANGE CONFINED COMMUNICATION," filed on Aug. 25, 2006, which U.S. Patent Application also is incorporated herein in its entirety.

TECHNICAL FIELD

The present invention relates to network security apparatus and methods and, in particular, to network adapters and methods providing a secure setup for shared physical medium devices.

BACKGROUND

As the convergence of universal communications and ubiquitous computing pervades daily life, new networking architectures are evolving to meet a myriad of applications. Some architectures address desires for home appliance and utility automation, control, telemetry, and security. Others are designed to offer convenient, unified remote management of distributed personal audiovisual equipment. Still others describe hardware and protocols intended to deliver broadband content to a destination (e.g., a home) using existing commercial and public transmission networks. Yet others provide a simple shared services network infrastructure using the existing access points, conduits, and wiring available within many modern homes and offices.

A shared services network is one that is capable of providing disparate services using the same transmission medium, and that may be coupled to selected existing commercial and public transmission networks. Exemplary shared services network infrastructures include, without limitation, wireline telephony, electrical power utility, and cable-access services infrastructures. These latter architectures may be designed from the perspective of a consumer, where reliability, transparency, thriftiness, and simplicity, of installation, use, and upkeep (in the aggregate, "user-friendliness") are among the most significant considerations in adoption of technology.

Beneficially, many wireline and wireless architectures, devices, and protocols are converging to allow some degree of interoperability among networks intended for consumer home, or small office/home office environments (collectively, "end-point networks" or EPNs).

An architectural commonality of EPNs is the shared signal transmission medium (i.e., shared medium). In a shared medium network, all communication devices share the multiple access transmission medium, but only one device can drive the network at a time. A shared services network can be a type of shared medium network.

Although convenient, shared medium architectures also share vulnerability to eavesdropping and compromise, leaving attached devices exposed to unauthorized access, misuse, and tampering (collectively, intrusion). Unfortunately, no unified, standard security implementation has been devised to protect every network in every environment, and security mechanisms effective in one environment for one type of shared medium network, may offer little protection to other implementations. In practical use, traditional network security mechanisms, such as usernames and passwords, can be cumbersome to implement and manage in an EPN. In addition, the use of passwords and keys can be unwieldy when authenticating headless devices, that is, devices that lack user interface components or peripherals. Despite the simplifications that current existing network security methods and apparatus may bring to the consumer network user, even "easy" mechanisms may require multiple steps, out-of-band security password or key transfers and, unfortunately, significant user interaction.

Oftentimes, EPN users elect not to activate beneficial security services that may be available with selected EPN devices because the security implementation process may be too cumbersome or too inconvenient for the average EPN user, even those processes are thought to be "simplified." For example, a simplified, "two-button" security activation process, available with selected networking products, may require more interaction than is desirable to a user. In such a security activation process, a supplicant seeking a secure communications link becomes activated and attempts to connect over a shared medium to an authenticator coupled to the network.

During the supplicant activation period, an opportunity window exists during which one or both of the authenticator and the SD device may communicate using a non-secure or partially secure handshake, becoming vulnerable to unauthorized access. The apparent simplicity of this existing security management technique can be deceptive, because the limited opportunity window in which to accomplish security management may be insufficient to complete the task and one or both devices may time out. Moreover, existing "two-button" techniques typically require repetition for each client adapter to be attached to the network. For example, adding six devices to a network requires a user to repeat the security activation process six times and make at least twelve properly sequenced activation process steps. Such "simple" security activation may become even more cumbersome in the context of headless devices, including those disposed in inconvenient locations within a networked home (e.g., in an attic or crawl space or behind a large appliance).

A typical consumer user may be dissuaded from enjoying the benefits of EPN, because these security burdens lack sufficient "user-friendliness," and the risks of unsecured EPN operation may be too daunting. Frequently, EPN users operate an EPN without implementing security, becoming exposed to a myriad of intrusions from wireless and wireline portals alike. It is desirable, therefore, to provide methods and apparatus for simplifying network security deployment and use, including a powerline network, thereby encouraging consumers to benefit from the ubiquitous use of end-point networks.

DETAILED DESCRIPTION

Embodiments according to the present invention provide methods and apparatus for simplifying security deployment over a shared services, shared medium (S3M) end-point network (EPN) disposed in an end-user facility ("premises") for the purpose of receiving end-point services. In general, the term EPN signifies one or more interoperable, shared medium, multiple-access network(s), as well as a heterogeneous system of such networks. Within this context, the terms network and subnetwork also may be used herein interchangeably, because a constituent subnetwork of an EPN may be deemed to be a network when viewed alone. In addition, an EPN can include therein at least one shared services, shared medium (S3M) network. Thus, an EPN can possess attributes of shared medium networks and shared services networks, and constituent elements may be coupled by at least one of wireline or wireless transmission media. A premises is an end-user environment such as a home, a home office, or a facility of limited size in business, industry, academia, or public administration. Without loss of generality, the term EPN can be synonymous with the terms "home network," or "small office/home office" (SOHO) network. End-point services can include public utility and commercial services capable of being delivered to a premises. These services can be delivered to the premises by guided media (e.g., copper wire lines, coaxial cable lines, fiber optic lines, and utility piping) as well as by unguided media (e.g., wireless services communicated via radiated electromagnetic energy such as radio signals). Exemplary utility services include electrical power and public telephony services. Exemplary commercial services include CATV (cable) and digital services delivered by guided media or unguided media, whether under subscription or by public broadcast.

Figure 1:
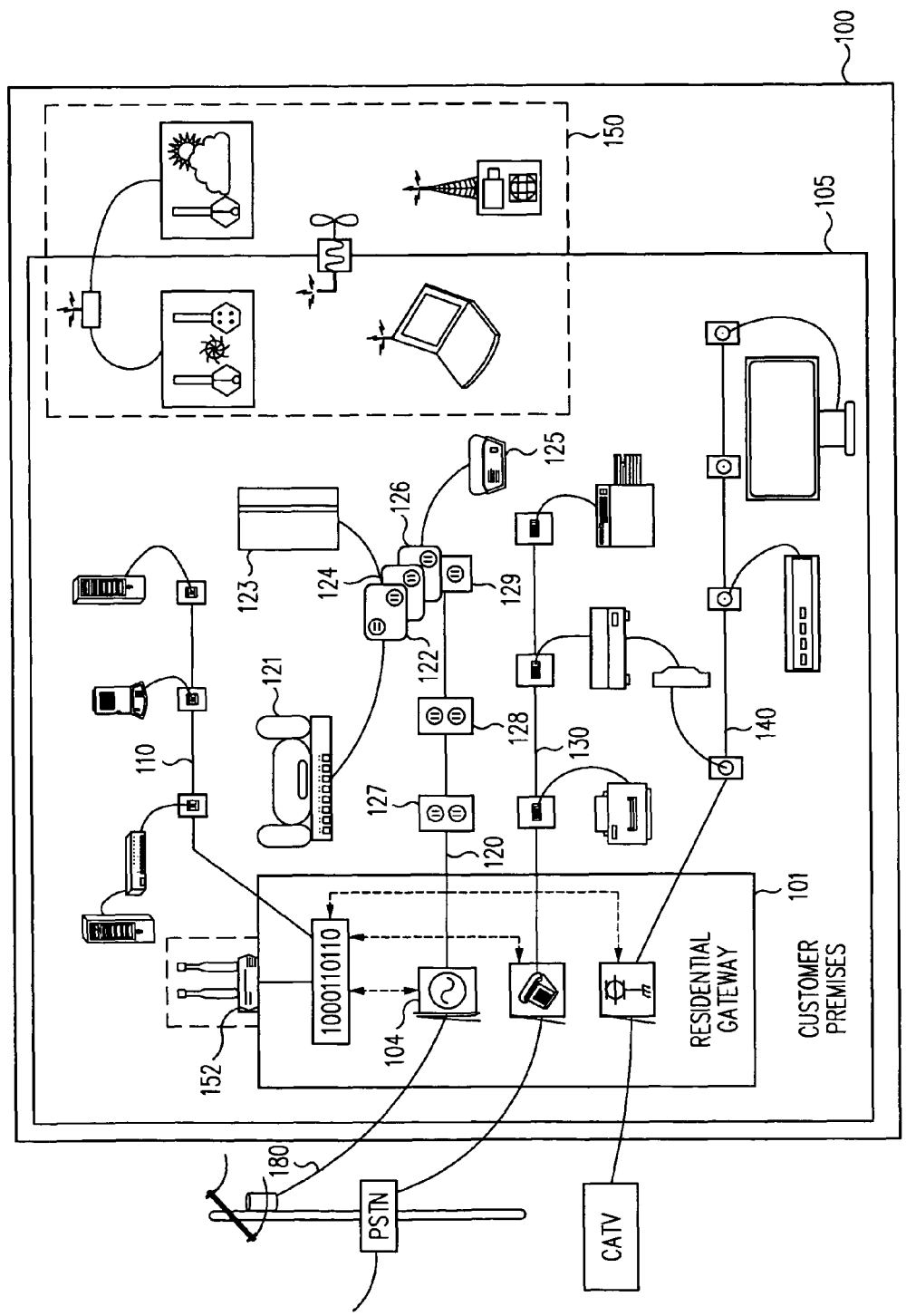
FIG. 1 is a diagrammatic representation of a EPN including end-point networks configured according to embodiments of the invention herein.

Within the context of the foregoing, FIG. 1 illustrates home network EPN 100, which operates within a defined region, including customer premises 105. Home network 100 is a heterogeneous EPN with constituent wireline and wireless end-point networks. Exemplary constituent wireline EPNs include, without limitation, a Ethernet EPN (EEPN) 110; a powerline network (PEPN) 120; a phoneline network (TEPN) 130; and a cable network (CEPN) 140. Wireless local area network (WLAN) 150 can be a constituent EPN of EPN 100, coupled to EEPN 110, for example, by way of access point 152.

A powerline EPN, such as PEPN 120, is a shared services, shared medium (S3M) network, in which the shared medium of the S3M network is, for the most part, the interconnected structural utility wiring available in premises 105. However, a powerline EPN also can include connectable electrical power extensions thereto. Thus, a powerline endpoint network can be easily and readily reconfigured within premises 105. Conveniently, a powerline EPN such as PEPN 120 may be extended beyond the physical boundaries of premises 105 by a limited range, by a simple electrical power extension cord. Inventive embodiments herein contemplate utility service implementations in which both utility electrical power and digital services are delivered to premises 105 over public utility electrical transmission medium 180, and in which utility electrical power is received without digital services.

Residential gateway 101 can be an adapter located at a point of ingress and egress of end-point services to customer premises 105, though which digital services are provided to one or more of constituent wireline and wireless networks 110, 120, 130, 140, and 150. For example, gateway 101 can be disposed at the utility ingress into premises 105 through which electrical power is received over public utility electrical transmission medium 180. Residential gateway 101 may facilitate intercommunication and interoperability among EPN 110, 120, 130, 140, and 150 and, importantly, provide security and configuration services to the constituent EPN, as well as to the networked devices connected to the respective EPN. In an exemplary embodiment in which transmission medium 180 conveys digital services premises 105, powerline host adapter (PHA) 104 may be a constituent element of gateway 101, configured to cooperate with PEPN 120 and to facilitate digital services delivery over public transmission medium 180. Egress of digital signals from premises 105 emanating over PEPN 120 also may be allowed over transmission medium 180 through PHA 104. In the alternative, PHA 104 may be separate from, but in operable communication with, gateway 101. It may be desirable to configure PHA 104 to provide security and configuration services to PEPN 120. However, to reduce the risk of intrusion by rogue or network hopping devices, it may be advantageous for PEPN 120 to implement security and configuration functions locally and not to rely upon gateway 101, or upon host adapter 104, as the sole, or as the primary, provider of security and configuration services.

PEPN 120 is an exemplary S3M EPN, capable of locally implementing security and configuration functions, that conducts electrical power from public utility electrical transmission medium 180 to a host device that is coupled to an S3M client adapter In FIG. 1 adapters 122, 124, 126 of PEPN 120 are illustrated to be disposed in a piggyback configuration mode, for the purposes of describing that mode of operation. However, it is to be understood that following configuration, S3M client adapter 122 can be coupled to the powerline shared medium via electrical connector 127, client adapter 124 can be coupled to the powerline shared medium via electrical connector 128, and S3M client adapter 126 can be coupled to the powerline shared medium via electrical connector 129. In PEPN 120, home entertainment system 121 is coupled to S3M client adapter 122, refrigerator/freezer unit 123 is coupled to S3M client adapter 124, and premises manager 125 is coupled to S3M client adapter 126. Moreover, S3M client adapters 122, 124, and 126 can be configured to communicate over PEPN 120 as networked devices. Exemplary of specifications and standards which may be used with powerline devices, include Broadband over Powerline (BPL) specification and standards (in the aggregate, "HomePlug™ standards"), promulgated by the HomePlug™ Powerline Alliance, San Ramon, Calif., USA. However, embodiments of the present invention are in no way limited thereto.

Typically, a HomePlug™-configured adapter, such as adapter 126, which includes a passthrough connection, is configured to permit a non-HomePlug™-configured device to connect to the shared medium of PEPN 120 to receive electric power. However, a passthrough connection also will permit a second HomePlug™-configured client adapter, such as S3M client adapter 124, to "piggyback" onto the physical connection between S3M client adapter 126 and PEPN 120. In addition, S3M client adapter 124 also may be configured to have a passthrough connection and, in a manner similar to the communication link established between PEPN 120 and S3M client adapter 126, S3M client adapter 124 may be configured to permit a third adapter 122 to "piggyback" onto the physical connection between S3M client adapters 124, 126 and PEPN 120. Powerline client adapters 122, 124, 126 are described in the context of a HomePlug™-configured adapter only as a convenience to facilitate understanding, and client adapters 122, 124, 126 are in no way limited thereto.

In FIG. 1, S3M client adapter 122, 124, 126 are illustrated to be configured as being piggybacked, that is client adapter 126 can be directly plugged into PEPN 120, client adapter 124 is plugged into client adapter 126, and client adapter 122 is plugged into client adapter 124. In an alternative configuration, each of client adapters 122, 124, and 126 is functional when plugged into separate electrical power connections 127, 128, and 129. Beneficially, S3M client adapters 122, 124, and 126 can enable respective host devices 121, 123, 125 to communicate as peer-to-peer networked devices, as may be the case where facility manager 125 is configured to communicate via S3M client adapter 126 over PEPN 120 to one or both of home entertainment system 121 via S3M client adapter 122, and refrigerator/freezer unit 125 via S3M client adapter 124, for example, to manage device health, operating and performance characteristics, maintenance information, and energy demand. Advantageously, S3M client adapters 122, 124, and 126 can be configured to employ S3M security and configuration services to lessen the likelihood of rogue client adapter or network hopping devices from causing an intrusion on PEPN 120.

In accordance with the inventive embodiments herein, one or more of S3M client adapters 122, 124, and 126 can be configured to employ S3M security and configuration services as one or both of an authenticating device (AD) or a supplicant device (SD). In general, an AD is configured to discover and be discovered, access, interrogate, recognize, authenticate, and exchange security and configuration information with, other S3M client adapters connected to PEPN 120. Similarly, an SD is configured to discover and be discovered, allow access, respond, supply identifying credentials, cooperate with authentication, and exchange security and configuration information, with an AD. Prior to authentication by an AD, a device connected to PEPN 120, including a S3M client adapter, may be classified as being unauthorized, and as being authorized, after authentication. Desirably, S3M client adapters 122, 124, and 126, reject or ignore signals communicated by unauthorized devices over PEPN 120, thereby increasing the degree of security afforded PEPN 120 and lessening the likelihood of intrusion by a rogue or network-hopping device. An SD may communicate a discovery signal on PEPN 120, as an authorization request, seeking to be discovered, recognized, and authenticated by an AD, and thus an authorized device on PEPN 120. Similarly, an AD may communicate a discovery signal on PEPN 120, soliciting unauthorized devices to seek authentication. However, because open solicitation by an AD may provide information that facilitates intrusion, it may be desirable to configure S3M client adapters 122, 124, and 126, to communicate a discovery signal, i.e., an authorization request, when operating as an unauthorized SD, but not to communicate a discovery signal, i.e., an authorization solicitation, when operating as an authorized AD. Alternatively, AD authorization solicitation may be desirable in implementations where a previously authorized S3M client adapter, or a networked device, including a newly connected S3M client adapter, responds to the AD the solicitation with an acceptable response code or passcode. Furthermore, when S3M client adapters 122, 124, and 126, are implemented to operate in plural selectable modes of operation, it may be desirable to configure to perform an AD authorization solicitation when operating in a first mode of operation, and to perform an SD authorization request when operating in a second mode of operation.

In selected embodiments, it may be advantageous to implement multi-mode operations in an S3M client adapter, including at least one of S3M client adapters 122, 124, and 126, such that at least one predetermined S3M security management service is provided in a predetermined mode of operation. Desirably, at least one of S3M client adapters 122, 124, and 126, is configured to operate in a piggyback (physical contact and near-contact proximity) mode in order to provide securely at least one of a security setup S3M security management service or an adapter configuration S3M security management service. Security setup S3M security management service may include, without limitation, functions effecting client adapter identification and authorization, and exchanging security information, such as a security key, to establish secure communications during other modes of operation. Adapter configuration S3M security management service may include, without limitation, any negotiation, assignment, or exchange, of at least one of port, network address, protocol information; location awareness determination; adapter priority assignment; configuration of adapter operating, performance, and power management parameters; and host device-specific information.

Adapter configuration S3M security management service may be used to establish a defined adjacency, or neighborhood, among S3M client adapters on a powerline network, including S3M client adapters 122, 124, and 126, on PEPN 120. An S3M client adapter disposed in a neighborhood may be designated as a neighbor of other S3M client adapters disposed in that neighborhood. Within the context of FIG. 1, S3M client adapters 122, 124, and 126 may form a neighborhood when electrically coupled to electrical outlets 127, 128, and 129. In a piggyback mode, information regarding neighborhood and neighbors may be determined, negotiated, exchanged and retained among piggybacked S3M client adapters, for example, to be used when S3M client adapters 122, 124, and 126 are later disposed, spaced apart, in their neighborhood. According to the foregoing S3M security management principles, a neighbor can be an authorized neighbor (AN) or an unauthorized neighbor/device (UN or UD). In general, an authorized neighbor may accept signals communicated by other authorized neighbors but, apart from an authorization request discovery signal, may reject or ignoring signals from unauthorized neighbors. An unauthorized neighbor that communicates, or is configured to communicate, an authorization request discovery signal can be designated as a supplicant neighbor (SN).

After security setup and configuration in a piggyback mode, an S3M client adapter identified as an AN can recognize and communicate with other AN connected to PEPN 120, but may reject or ignore signals, including an authorization request, communicated from an UN, including an SN. In certain embodiments, it may be advantageous to configure an AN to provide a selected S3M security management service to a SN in a most proximate presence (nearest neighbor) mode, or in a definable proximate presence (k-neighbor) mode, for example, where the SN communicates an authorization request including an acceptable response code or passcode, which may have been exchanged during a previous piggyback configuration, or provided by an S3M client adapter manufacturer or vendor as a secret key. However, in a standard networked communication mode, an AN may reject or ignore signals communicated by an SN, a UN, or a client adapter disposed outside the neighborhood of the AN.

A piggyback configuration mode can be useful to exchange S3M security information between an AN and an SN using very low power, owing to the physical and electrical proximity of the S3M client adapters, effectively thwarting intrusion into the communications between the communicating S3M client adapters. In such a manner, an AN and an SN can securely exchange information and establish parameters that may be used, for example, for encrypted communications between authorized S3M client adapters. In other words, the AN and SN can share their secret cipher information in "private," much as one friend whispers a secret into the ear of another. Once so configured, S3M client adapters 122, 124, and 126, can communicate securely despite being be set apart and disposed along the shared medium of PEPN 120, along with their respective host devices.

Moreover, once a piggybacked SN client adapter is authenticated and configured, it is re-designated as an AN. Thus, a first S3M client adapter may serve as an AN to a second S3M client adapter requesting authorization as an SN. The first S3M client adapter may be designated as a primary AN, which configuration includes a technique of restricted authentication, in which the first S3M client adapter authenticates all SN S3M client adapters that are concurrently coupled. This restriction may be desirable to implement for a selected mode including a piggyback mode. Alternatively, the second S3M client adapter, once authorized by the second S3M client adapter, may serve as a AN to authenticate a third S3M client adapter, which is requesting authorization as an SN, with the third AN may authenticate a fourth, and so on. This unrestricted authorization technique may be a beneficial supplement to the aforementioned restricted authentication technique, for example, in a mode of operation different from the mode in which the restricted authentication technique is employed, and may allow distributed authentication services to previously-authorized S3M client adapters rejoining a reconfigured PEPN 120, or to an SN joining PEPN 120 using a acceptable response code or passcode.

Furthermore, it may be advantageous to include in S3M client adapters 122, 124, 126, a storage device (not shown), for example, nonvolatile memory, which may be used in the piggyback mode to store S3M security management service information, relative to the respective S3M client adapter 122, 124, 126, as well as to store S3M security management service information, relative to other S3M client adapters which may have been piggybacked to S3M client adapter 122, 124, or 126. Retention of S3M security management service information may be useful, for example, when returning all or part of PEPN 120 to service, as well as during configuration changes to PEPN 120. This feature also is advantageous because it provides a robust, distributed retained network memory of selected S3M security management service information, a form of tribal knowledge for PEPN 120, thereby relieving the operator of EPN 100/PEPN 120 of the burden of taking additional security steps whenever there is a change in the configuration of PEPN 120.

Also, one or more of S3M client adapters 122, 124, 126 may be configured with a user interface, providing a perceptible indication of adapter configuration. Simple but effective interfaces may include, for example, one or both of a visual annunciator, such as an illuminable LED, or an aural annunciator, such as an audible tone emitter, where the perceptible indication can be indicative of a successful setup and configuration of the respective S3M client adapter 122, 124, 126. In the alternative, setup of security and configuration information may be limited to a predefined configuration period, after which an operator of EPN 100/PEPN 120 may assume that the selected S3M client adapter 122, 124, 126 has been configured. Perceptible indications may add a modicum of "user-friendliness" to a user of EPN 100, for example, during the course of installing and configuring headless devices and adapters.

Figure 2:
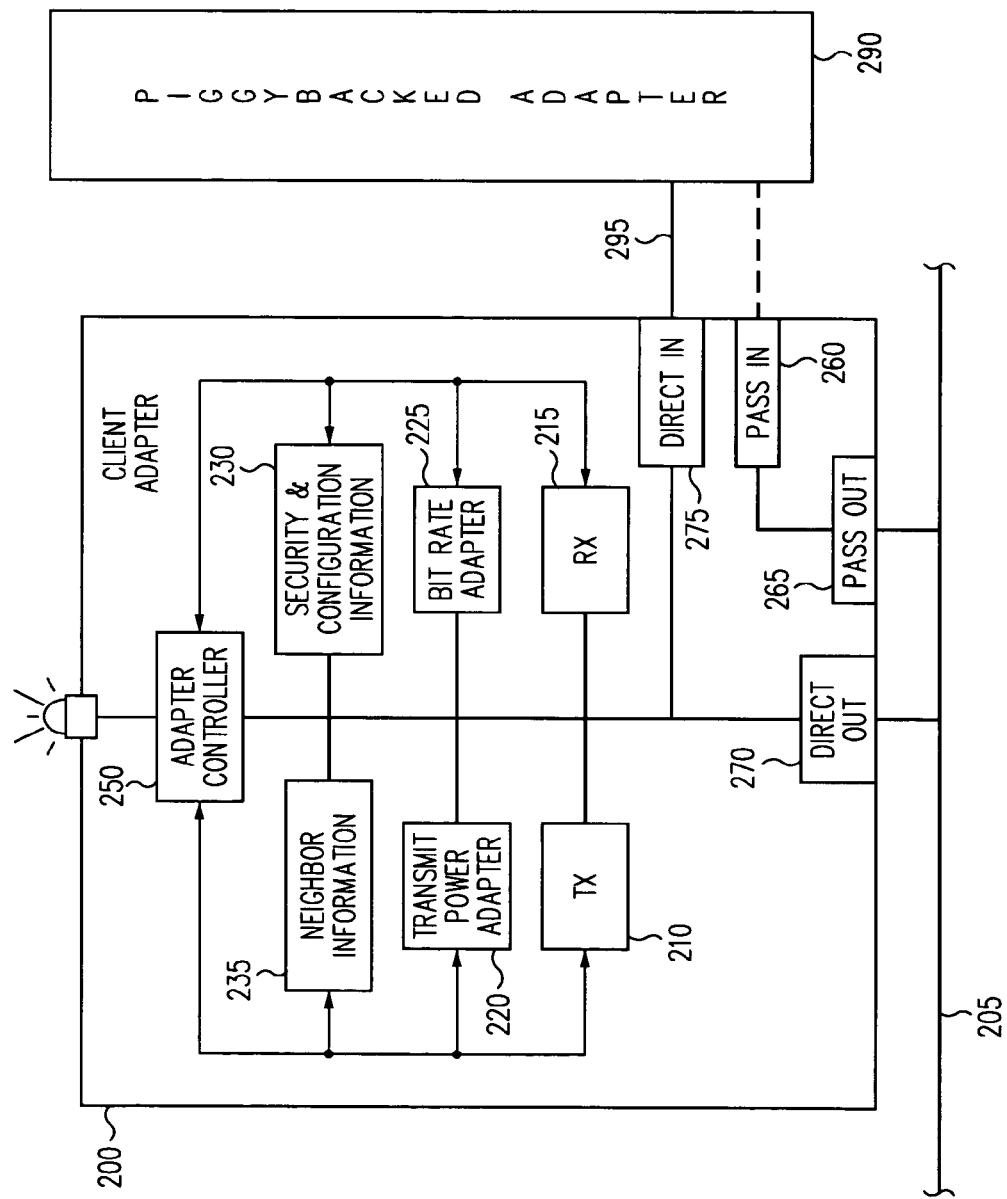
FIG. 2 is a block diagram of a client adapter, in accordance with embodiments of the present invention.

FIG. 2 illustrates an S3M client adapter 200, which exemplifies at least one of S3M client adapters 122, 124, 126, and which may be used as a client adapter on PEPN 120. In general, client adapter 200 can be coupled to EPN medium 205, can transmit signals over EPN medium 205 using transmit module (TX) 210, and can receive signals over EPN medium 205 using receive module (RX) 215. EPN medium 205 can be an S3M network transmission medium, as represented in FIG. 1 by PEPN 120. Adapter 200 can be configured to detect or to "listen" for other devices and adapters, which may signal on medium 205 and seek to communicate with adapter 200 for effecting neighbor security management, configuration, or both.

Adapter 200 also includes adapter controller 250, which is coupled to, and configured to manage TX 210, RX 215, first shared medium port 270 and second shared medium port 275. In general, adapter controller 250 also configured to control the S3M security management services by managing and facilitating communication, configuration, and security services provided by S3M client adapter 200, including without limitation, selected service and data management, unauthorized device interrogation and recognition, power and signal connection control and maintenance, and secure, appropriate exchange of stored S3M security management service information. Exemplary communication services include signal transmission, signal reception, power level and bit rate setting and adaptation, channel condition adaptation, signal filtering, signal identification and management, and the like, as known to skilled artisans. Exemplary configuration services can include OSI Layer 1-4 functions pertaining to physical-logical signal translation, device and adapter address management and control, inter- and intra-layer data direction, filtering, management, and control, and the like. Exemplary security services can include neighbor detection, recognition, rejection, access control, authentication, audit, and authorization. In the context of PEPN 120 in FIG. 1, adapter controller 250 can be configured to engage adapter 200 as an AN as well as an SN, and to communicate S3M security management service information with other client adapters, including piggybacked second S3M client adapter 290. Thus, adapter controller 250 may sense, recognize, and respond to a received discovery signal communicated over EPN medium 205. Adapter controller 250 also may cooperate with other client adapters (not shown) connected to EPN medium 205 to perform a selected S3M security management service, including a configuration service, a security service, or both. Adapter 200 can include first storage 230 which may be used to retain security and configuration information pertaining to adapter 200. Adapter 200 also may include second storage 235, which may be used to retain information pertaining to another client adapter, as well as to the network interconnected via medium 205. To facilitate data retention while adapter 200 is powered OFF, at least a portion of first storage 230 can be nonvolatile memory storage, and at least a portion of second storage 235 also may be nonvolatile memory storage.

In addition, S3M client adapter 200 includes first passthrough port 260, second passthrough port 265, first shared medium port 270, and second shared medium port 275. First passthrough port 260 and second passthrough port 265 are constituents of a passthrough coupling; while first shared medium port 270 and second shared medium port 275 are constituents of a direct connect coupling, or direct coupling. It is advantageous to provide a passthrough coupling and a direct connect coupling on embodiments of S3M client adapter 200, which are configured as a powerline network client adapter conforming the aforementioned HomePlug™ standards. Adapter 200 can include a passthrough coupling by which signals from piggybacked second S3M client adapter 290 can pass through first S3M adapter 200, to EPN medium 205, by way of first passthrough port 260 and second passthrough port 265. A passthrough function is described additionally with respect to FIG. 1. Adapter 200 can include a direct connect coupling, including first shared medium port 270 and second shared medium port 275. In a direct connect coupling piggyback mode, the transmission medium also may be conductor 295 that electrically link client adapters, such as when second S3M client adapter 290 is plugged into first S3M client adapter 200. In the example illustrated by FIG. 2, second S3M client adapter 290 is substantially the same as first S3M client adapter 200. First shared medium port 270 can be used to connect adapter 200 directly to EPN medium 205, for direct communication by S3M client adapter 200 over EPN medium 205. Second shared medium port 275 is connected to first shared medium port 270, and be used for a direct connect function in a piggyback mode, as described within the context of FIG. 1. To implement a direct connect function in a piggyback mode, second shared medium port 275 is connectable to second client adapter 270, such that when so connected, second shared medium port 275 is configured to communicate between first shared medium port 270 and the piggybacked network adapter, here, second S3M client adapter 290. Thus, through a direct connect coupling second S3M client adapter 290 is connected through to communicate as a networked device with first client adapter 200, and is connected through second shared medium port 275 and first shared medium port 270 to communicate as a networked device over EPN medium 205, and to receive electrical power from shared services EPN medium 205.

Adapter controller 250 is connected to first shared medium port 270 to manage and control, with respect to S3M client adapter 200, signals communicated with networked devices (not shown) over EPN medium 205. First shared medium port 270 may also provide power management functions for client adapter 200, and adapter controller 250 is configured to supervise and control electrical power provided EPN medium 205 to S3M client adapter 200. Adapter controller 250 is also connected to second shared medium port 275 to manage and control signals communicated with networked devices (not shown) over, and electrical power provided through, EPN medium 205 to piggybacked network adapter 290, for example, during direct connect functions in the piggyback mode. Thus, adapter controller 250 may control S3M security management services provided to piggybacked network adapter 290, by managing and facilitating communication services, and S3M security management services, including configuration, and security services that are provided through second shared medium port 275.

While second S3M client adapter 290 is piggybacked and performing a direct connect function with first S3M client adapter 200, physical separation is minimal between TX 210 in client adapter 200 and a receive module in second S3M client adapter 290, comparable to RX 215, relative to neighbor client adapters (not shown), which may be disposed and set apart on EPN medium 205. Thus, a piggybacked mode can be advantageous for exchanging potentially sensitive S3M security management information between client adapter 200 and client adapter 290, because TX 210 may transmit low-powered signals having sufficient signal power so that they are communicated clearly and intelligibly to client adapter 290 receive module (not shown). At the same time, the low-powered signals transmitted by TX 210 may not be clear or intelligible to networked devices connected elsewhere on EPN medium 205. Also, under the aegis of adapter controller 250, first shared medium port 270 may be used to restrict signals transmitted by TX 210 to adapter 290 from being communicated into EPN medium 205. Similarly, second S3M client adapter 290 may transmit low-powered signals to first S3M client adapter 200, that have sufficient transmitted power, transmitted bit rate, or both, to be understandable to RX 215, but which may not possess sufficient transmitted power, for example, to be understandably detectable by a neighbor client adapter set apart from adapter 200 or by a rogue or network-hopping device. As before, first shared medium port 270 may be controlled by adapter controller 250 to restrict the signals communicated between adapters 200 and 290 from being transmitted over EPN medium 205. S3M security management services information, including secret keys and passcodes, timing and hash functions, and cipher and protocol selection, may be shared securely while in a piggybacked configuration (in the piggyback mode using direct coupling), allowing adapters 200 and 290 to perform authentication, identification, access control, and host device, adapter, and network configuration services as needed, and to establish codes and ciphers effecting secure network communications. Desirably, adapters 200 and 290 can be physically disconnected and set apart, after having configuration and security thus exchanged, with adapters 200 and 290 each being designated an AN. First storage 230 and second storage 235 may assist with retention of determined and exchanged S3M security management services information, once adapters 200, 290 are separated. When reconnected to EPN medium 205, it is desirable that one or both of first storage 230 and second storage 235 facilitate recognition and acceptance of one previously authorized client adapter 200 by another client adapter 290.

Once separated, S3M client adapter 200 can be configured to employ TX 210 to transmit neighborhood information into medium 205, and to cooperate to authenticate a SN as an AN (not shown), where an SN is present and capable of setup. TX 210 is configured to adapt transmission of the signal in accordance with a predetermined adaptation technique. Adapter 200 also may be configured to transmit nearest neighbor information into medium 205, to effect a k-nearest neighbor setup. In accordance with the foregoing principles and embodiments, including those described with respect to FIG. 1, adapter 200 can include a transmit power adapter 220 that adapts the effective power by which signals are transmitted over medium 205, in a manner suitable to implement S3M security management. In addition, adapter 200 can include bit rate adapter 225 that adapts the effective bit rate at which signals are transmitted from adapter 200 over medium 205, in a manner suitable to implement S3M security management. In that regard, TX power adapter 220 may transmit signals to medium 205 at an initial effective transmission power level, adapting transmission power level using a predetermined power increment. As another example, where client adapter 200 can be configured to effect one of nearest neighbor setup and of k-nearest neighbor setup, bit rate adapter 225 may transmit signals to medium 205 at an initial effective transmission bit rate, adapting bit rate transmission using a predetermined bit rate decrement. In addition, client adapter 200 can be configured to effect one of nearest neighbor setup and of k-nearest neighbor setup, by which TX power adapter 220 may transmit signals to medium 205 at an initial effective transmission power level, adapting transmission power level using a predetermined power increment, and by which bit rate adapter 225 may transmit signals to medium 205 at an initial effective transmission bit rate, adapting bit rate transmission using a predetermined bit rate decrement. Signals thus transmitted may communicate security management information, as well as configuration information to be detected by another adapter or device seeking to form or to join a network as an authorized neighbor of adapter 200. Also, adapter controller 250 can be configured to facilitate another adapter, such as adapter 200, in identifying and authenticating a nearest neighbor or k-nearest neighbor, and may be configured to perform an ad hoc network management function, for example, during network startup and the like.

One or more of initial effective power level, initial effective transmission bit rate, the predetermined power increment, and the predetermined bit rate decrement can be determinable and generally correspond to the signaling environment in which adapter 200 is disposed, including the channel characteristics of medium 205, as well as characteristics of other adapters and devices which may be expected to communicate with adapter 200 to effect security services encompassed by the embodiments herein and their foreseeable equivalents.

Moreover, adapter 200 may provide a perceptible indication of setup or configuration status, using interface device 245, here an LED responsive to adapter controller 250. One or more desirable implementation of transmitted signals adaptation, and one or more predetermined adaptation techniques are described in co-pending, co-assigned, U.S. patent application Ser. No. 11/468,194, entitled, "RANGE CONFINED COMMUNICATION APPARATUS AND METHOD," filed on Aug. 29, 2006, which U.S. patent application is incorporated herein in its entirety.

A variety of hardware and software functions have been described herein. Depending upon the implementation, many of the hardware functions may be emulated using software. Likewise, software functions may be performed using hardware components having hardwired circuitry; and some of the hardware or software functions may be configured using alternative technologies known to skilled artisans, including without limitation, firmware and application specific integrated circuits. The elements in the Figures are to be taken as logical and thus, can be implemented in a consolidated or distributed manner to achieve a desired result.

Moreover, many alterations and modifications may be made by those having ordinary skill in the art, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth, but all equivalent elements for performing substantially the same function in substantially the same way to obtain substantially the same result. The claims are thus to be understood to include what is specifically illustrated and described above, what is conceptually equivalent, and also what incorporates the ideas of the invention.

The invention claimed is:

1. A network adapter, comprising:
    a first shared medium port connectable to a shared services medium;
    a second shared medium port connected to the first shared medium port, connectable to a piggybacked network adapter, and configured to communicate between the first shared medium port and the piggybacked network adapter;
    an adapter controller connected to the first shared medium port and to the second shared medium port, and configured to communicate configuration information with the piggybacked network adapter, wherein the shared services medium is a powerline shared services medium, wherein the adapter controller is configured to provide a selected S3M security management service to a second adapter connected to one of the first shared medium port and the second shared medium port;
    a direct coupling including the first shared medium port connected with the second shared medium port, wherein the direct coupling is responsive to the adapter controller; and
    a passthrough coupling including a first passthrough port connected with a second passthrough port; wherein the passthrough coupling is not responsive to the adapter controller, and wherein one of the first and second passthrough port is connectable to the piggybacked network adapter and the other of the first and second passthrough port is connectable to the powerline shared services medium.

2. The network adapter of claim 1, wherein the adapter controller configures the network adapter as a authenticating neighbor client adapter, wherein the piggybacked network adapter is configured as a supplicant neighbor client adapter, and wherein the selected S3M security management service includes authenticating the supplicant neighbor as an authorized neighbor.

3. The network adapter of claim 1, further comprising:
    a transmitter and a receiver each coupled to the adapter controller, to the first shared medium port, and to the second shared medium port; and
    a storage device coupled to the adapter controller storing and configured to retain S3M security management information.

4. The network adapter of claim 3, wherein the adapter controller is configured to receive a discovery signal from a neighbor adapter, select an authentication response responsive to the discovery signal, and transmit the authentication response to the neighbor client adapter.

5. A network adapter, comprising:
    a first shared medium port connectable to a shared services medium;
    a second shared medium port connected to the first shared medium port, connectable to a piggybacked network adapter, and configured to communicate between the first shared medium port and the piggybacked network adapter;
    an adapter controller connected to the first shared medium port and to the second shared medium port, and configured to communicate configuration information with the piggybacked network adapter, wherein the shared services medium is a powerline shared services medium, wherein the adapter controller is configured to provide a selected S3M security management service to a second adapter connected to one of the first shared medium port and the second shared medium port and wherein the adapter controller provides the selected S3M security management service to the second adapter connected to the second shared medium port, and wherein the second adapter is a piggybacked network adapter,
    wherein the piggybacked network adapter is connected to the powerline shared services medium through a passthrough coupling.

6. A method for configuring a network adapter connected to a shared medium network, comprising:
    providing a first network adapter including a direct coupling and storage device, each responsively connected to an adapter controller, wherein the first network adapter is configured as an authenticating device;
    connecting a second network adapter in a piggyback mode through the direct coupling to the first network adapter, wherein the second network adapter is a piggybacked adapter physically and electrically connected to the first network adapter;

communicating a discovery signal through the direct coupling between the first network adapter and the piggybacked adapter, wherein the piggybacked adapter is identified by the first network adapter as a supplicant device;

selectively communicating a security management service information between the authenticating device and the supplicant device; and authenticating the supplicant device as an authorized device, wherein the direct coupling includes a first shared medium port connected to a shared services shared medium (S3M) network medium constituent of an end-point network, and a second shared medium port connected to the piggybacked adapter, wherein communicating a discovery signal further comprises:

allowing the discovery signal to be communicated between the first network adapter and the piggybacked adapter though the second shared medium port, and restricting the communicating of the discovery signal through the first shared medium port to the S3M network medium.

7. The method of claim 6, further comprising exchanging selected security management service information between the authenticating device and the supplicant device;

evaluating the selected security management service information received from the supplicant device by the authenticating device;

determining whether to authenticate the supplicant device as an authorized device or as an unauthorized device.

8. The method of claim 7, further comprising communicating the discovery signal as an authorization request by the supplicant device to the authenticating device.

9. The method of claim 7, further comprising communicating the discovery signal as an authorization solicitation by the authenticating device to the supplicant device.

10. The method of claim 6, further comprising:

exchanging selected S3M security management services information between the authenticating device and the supplicant device, responsive to the discovery signal;

evaluating the selected security management service information received from the supplicant device by the authenticating device;

determining whether to authenticate the supplicant device as an authorized device or as an unauthorized device;

if an authorized device, negotiating at least one of a secure network communication configuration and secure network communication protocol for communications exchanged between the first network adapter and the second network adapter over an EPN, and communicating EPN neighborhood information therebetween, retaining security management service communication information pertaining to the at least one of a secure network communication configuration, a secure network communication protocol, and neighborhood information;

restricting at least one of exchanging selected S3M security management services information and negotiating a secure network communication protocol from being communicated through the first shared medium port to the S3M network medium.

11. The method of claim 10, further comprising:

connecting each of the first network adapter and the second network adapter to an EPN medium with one adapter disposed apart relative to the other adapter;

securely communicating a discovery signal between the first network adapter and the second network adapter using the security management service communication information;

determining by one of the first network adapter and the second network adapter whether the other of the first network adapter and the second network adapter is an authorized device;

if so, determining whether the authorized device is a authorized neighbor; and establishing a neighborhood of authorized neighbors communicating over a defined portion of an EPN medium.

* * * * *